United States Patent
Sun et al.

(10) Patent No.: US 9,854,532 B2
(45) Date of Patent: Dec. 26, 2017

(54) METHOD, NETWORK NODES, AND COMPUTER PROGRAM PRODUCTS FOR LOAD BASED ADAPTIVE CRS POWER ADJUSTMENT

(71) Applicant: Telefonaktiebolaget L M Ericsson (publ), Stockholm (SE)

(72) Inventors: Ying Sun, Sundbyberg (SE); Wei Zhao, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 14/564,721

(22) Filed: Dec. 9, 2014

(65) Prior Publication Data

US 2016/0165546 A1    Jun. 9, 2016

Related U.S. Application Data

(60) Provisional application No. 62/088,430, filed on Dec. 5, 2014.

(51) Int. Cl.
| | |
|---|---|
| *H04W 52/18* | (2009.01) |
| *H04L 5/00* | (2006.01) |
| *H04W 52/32* | (2009.01) |
| *H04W 52/34* | (2009.01) |

(Continued)

(52) U.S. Cl.
CPC .......... *H04W 52/18* (2013.01); *H04L 5/0048* (2013.01); *H04W 52/143* (2013.01); *H04W 52/325* (2013.01); *H04W 52/343* (2013.01); *H04W 52/367* (2013.01)

(58) Field of Classification Search
None
See application file for complete search history.

(56) References Cited

U.S. PATENT DOCUMENTS 5,987,307 A * 11/1999 Buskirk ................ H04W 52/52
                                                            375/219
6,002,671 A * 12/1999 Kahkoska ............. H04M 3/304
                                                            348/192

(Continued)

FOREIGN PATENT DOCUMENTS

| EP | 2509372 A1 | 10/2012 |
|---|---|---|
| WO | 2014029892 A1 | 2/2014 |

OTHER PUBLICATIONS

Notification of Transmittal of International Search Report and The Written Opinion of the International Search Authority cited in PCT/SE2015/050004 dated Aug. 3, 2015, 10 pgs.

*Primary Examiner* — Jeffrey M Rutkowski
*Assistant Examiner* — Jonathan B Wood
(74) *Attorney, Agent, or Firm* — Rothwell, Figg, Ernst & Manbeck, P.C.

(57) ABSTRACT

A method performed in a network node. The method includes the network node receiving a report regarding a traffic load of at least one network cell of a plurality of network cells. The method further includes the network node determining whether the traffic load of the at least one network cell is greater than an average traffic load of the plurality of network cells. The method further includes the network node adjusting a power of a reference signal based on said determining. The method also includes the network node transmitting the adjusted reference signal in the at least one network cell.

16 Claims, 9 Drawing Sheets

(51) Int. Cl.
*H04W 52/14* (2009.01)
*H04W 52/36* (2009.01)

(56) References Cited

U.S. PATENT DOCUMENTS

| | | | | |
|---|---|---|---|---|
| 8,626,109 B2* | 1/2014 | Ma | | H04B 7/0871 |
| | | | | 455/132 |
| 9,351,193 B2* | 5/2016 | Raleigh | | H04M 15/80 |
| 2002/0001292 A1* | 1/2002 | Miyamoto | | H04W 52/367 |
| | | | | 370/335 |
| 2003/0087680 A1* | 5/2003 | Kim | | H04W 52/0293 |
| | | | | 455/574 |
| 2004/0072565 A1* | 4/2004 | Nobukiyo | | H04W 36/22 |
| | | | | 455/436 |
| 2004/0110477 A1* | 6/2004 | Nishimura | | H04W 52/12 |
| | | | | 455/127.1 |
| 2005/0070294 A1* | 3/2005 | Lyle | | H01R 23/688 |
| | | | | 455/452.2 |
| 2006/0271313 A1* | 11/2006 | Mollenkopf | | H02J 13/0082 |
| | | | | 702/62 |
| 2007/0265017 A1* | 11/2007 | Ishii | | H04W 28/16 |
| | | | | 455/453 |
| 2008/0259833 A1* | 10/2008 | Ozturk | | H04L 1/0007 |
| | | | | 370/310 |
| 2009/0264077 A1* | 10/2009 | Damnjanovic | | H04W 52/244 |
| | | | | 455/63.1 |
| 2009/0323600 A1* | 12/2009 | Chandra | | H04W 28/18 |
| | | | | 370/329 |
| 2010/0085884 A1* | 4/2010 | Srinivasan | | H04W 16/08 |
| | | | | 370/252 |
| 2010/0093385 A1 | 4/2010 | Kazmi et al. | | |
| 2010/0158013 A1* | 6/2010 | Kliger | | H04L 12/2861 |
| | | | | 370/393 |
| 2011/0034196 A1* | 2/2011 | Jonishi | | H04W 24/02 |
| | | | | 455/509 |
| 2011/0267948 A1* | 11/2011 | Koc | | H04L 5/003 |
| | | | | 370/235 |
| 2011/0276982 A1* | 11/2011 | Nakayama | | G06F 9/505 |
| | | | | 718/105 |
| 2012/0019215 A1* | 1/2012 | Wenger | | B60L 11/005 |
| | | | | 320/149 |
| 2012/0201164 A1* | 8/2012 | Jongren | | H04L 5/0048 |
| | | | | 370/252 |
| 2012/0233427 A1* | 9/2012 | Hou | | G06F 21/79 |
| | | | | 711/163 |
| 2013/0028217 A1* | 1/2013 | Sumasu | | H04J 11/0023 |
| | | | | 370/329 |
| 2013/0183985 A1* | 7/2013 | Park | | H04W 52/241 |
| | | | | 455/444 |
| 2014/0003341 A1* | 1/2014 | Hu | | H04W 52/146 |
| | | | | 370/328 |
| 2014/0133426 A1* | 5/2014 | Liu | | H04W 52/143 |
| | | | | 370/329 |
| 2014/0177531 A1* | 6/2014 | Imamura | | H04W 24/10 |
| | | | | 370/328 |
| 2014/0219243 A1* | 8/2014 | Meshkati | | H04W 52/243 |
| | | | | 370/331 |
| 2014/0241198 A1* | 8/2014 | Sun | | H04L 5/0048 |
| | | | | 370/252 |
| 2014/0286219 A1* | 9/2014 | Siomina | | H04J 11/0023 |
| | | | | 370/311 |
| 2014/0301342 A1* | 10/2014 | She | | H04W 52/242 |
| | | | | 370/329 |
| 2015/0117234 A1* | 4/2015 | Raman | | H04L 43/10 |
| | | | | 370/252 |
| 2015/0131430 A1* | 5/2015 | Chan | | H04W 76/064 |
| | | | | 370/217 |
| 2015/0340880 A1* | 11/2015 | Kdoshim | | H02J 5/005 |
| | | | | 307/104 |
| 2016/0007232 A1* | 1/2016 | Wang | | H04B 7/0456 |
| | | | | 370/280 |
| 2016/0057765 A1* | 2/2016 | Jiang | | H04W 16/10 |
| | | | | 370/329 |
| 2016/0112169 A1* | 4/2016 | Yerramalli | | H04L 1/1822 |
| | | | | 370/252 |
| 2016/0135087 A1* | 5/2016 | Xu | | H04W 28/08 |
| | | | | 455/436 |
| 2016/0295525 A1* | 10/2016 | Zhu | | H04B 7/0617 |

* cited by examiner

METHOD, NETWORK NODES, AND COMPUTER PROGRAM PRODUCTS FOR LOAD BASED ADAPTIVE CRS POWER ADJUSTMENT

CROSS-REFERENCE TO RELATED APPLICATIONS

This application claims the benefit of provisional application No. 62/088,430, filed on Dec. 5, 2014, which is incorporated by reference herein.

TECHNICAL FIELD

Disclosed herein are, for example, methods, network nodes, and computer program products for load based adaptive CRS Power Adjustment.

BACKGROUND

In 3GPP networks, most of the channels (e.g, DPSCH, DPCCH, PBCH etc) are used to carry information as a sequence of bits in which they have some higher layer channel connected to them. However, a reference signal is a special signal that exists only in the Physical (PHY) layer. The purpose of this reference signal is to deliver a reference point for the downlink power.

When the UE tries to determine the downlink (DL) power (i.e, the power of the signal from an eNode B), the UE measures the power of this reference signal and uses this measured power as the downlink cell power. These reference signals are carried by multiple specific resource elements in determined slots, and the location of the resource elements are specifically determined by antenna configuration. FIG. 1 illustrates example time slots in which the reference signal is carried, and the resource elements marked in gray are the ones reserved for the reference signal, but are not carrying the reference signal for that specific antenna.

There are two different types of reference signals: the Cell Specific Reference Signal (CRS) and the UE Specific Reference Signal. The CRS is being transmitted at every subframe and it spans across the entire operating bandwidth. Generally, the CRS is transmitted by Antenna port 0,1,2,3. The location of the Cell specific Reference Signal varies according to Physical Cell ID. The downlink cell specific reference signal can be used for (i) cell search and initial acquisition; (ii) downlink channel quality measurements; and (iii) downlink channel estimation for coherent demodulation/detection at the UE.

For decoding any downlink data, the first step is to detect/decode the CRS transmitted from the eNodeB. If the power of the CRS is the same as all other power channels, it would be extremely difficult to detect the CRS. Thus, some implementations make the power of the CRS large as compared to other channels as shown in the black bar in FIG. 2 in which an offset (P_A) between the CRS and other channels exist.

However, because the reference channels occur only in specific symbols instead of every symbol, a complication exists in which there are some symbols with the reference signal in it, and there are some other symbols without reference signal in it. When this situation occurs, if the power of each symbol is measured, some symbols (i.e., symbols with the CRS) have higher power than the other symbols (i.e., symbols without CRS), which complicates the implementation of the receiver equalizer.

In one attempt to solve the problem of the power difference between two groups of symbols, lesser power (P_B) can be applied to the non-reference signal channels at the symbol carrying reference signal. However, in this solution, there is a complicated peak-and-valley type of power terrain rather than the flat plain terrain in downlink power allocation. This complicated peak- and valley type of power terrain requires a more complicated receiver implementation.

One important usage of the CRS by UEs is to perform cell search and initial camping. In other words, the received signal strength of the CRS may impact UE distribution in certain cells. Current solution has the same CRS power adjustment for all cells. In scenarios with unevenly distributed load (i.e., some cells are over heavily loaded while other neighboring cells are lightly loaded) the uniformly boosted CRS power does not help with load balancing.

SUMMARY

In one aspect, a method for adjusting the power of a cell specific reference signal (CRS) is provided. According to some exemplary embodiments, the method includes a network node receiving a report regarding a traffic load of at least one network cell. The method further includes the network node determining whether the traffic load of the at least one network cell is greater than an average traffic load of a plurality of network cells. The method further includes the network node adjusting a power of a reference signal (e.g., a cell specific reference signal) based on said determining. The method also includes the network node transmitting the adjusted reference signal in the cell.

In some embodiments, network node serves on or more of a plurality of network cells. The network node includes a processor and a computer readable medium coupled to the processor. The computer readable medium contains instructions executable by the processor. The network node is operative to receive a report regarding a traffic load of at least one network cell of the plurality of network cells. The network node is further operative to determine whether the traffic load of the at least one network cell is greater than an average traffic load of the plurality of network cells. The network node is further operative to adjust a power of a reference signal based on said determination. The network node is also operative to transmit the adjusted reference signal in the cell.

In some embodiments, a computer product is implemented in a network node that serves one or more of a plurality of cells. The computer product includes a non-transitory computer readable medium storing computer instructions for the network node receiving a report regarding a traffic load of at least one network cell of the plurality of network cells; the network node determining whether the traffic load of the at least one network cell is greater than an average traffic load of the plurality of network cells; the network node adjusting a power of a reference signal based on said determining; and the network node transmitting the adjusted reference signal in the cell.

BRIEF DESCRIPTION OF THE DRAWINGS

The accompanying drawings, which are incorporated herein and form part of the specification, illustrate various embodiments.

DETAILED DESCRIPTION

Embodiments are directed to an adaptive CRS power setting among neighboring cells in a coordinated way based on cell load. The CRS of a given cell can be further boosted if the load is light, or de-boosted compared with its neighboring cells if it is heavily loaded. The further boost and de-boost are based on certain criteria to make sure the desired throughput and other important KPIs are maintained. By adjusting the CRS power of different cells, UEs can be "guided" by the network to select the less loaded cell during cell search and initial acquisition.

Figure 1:
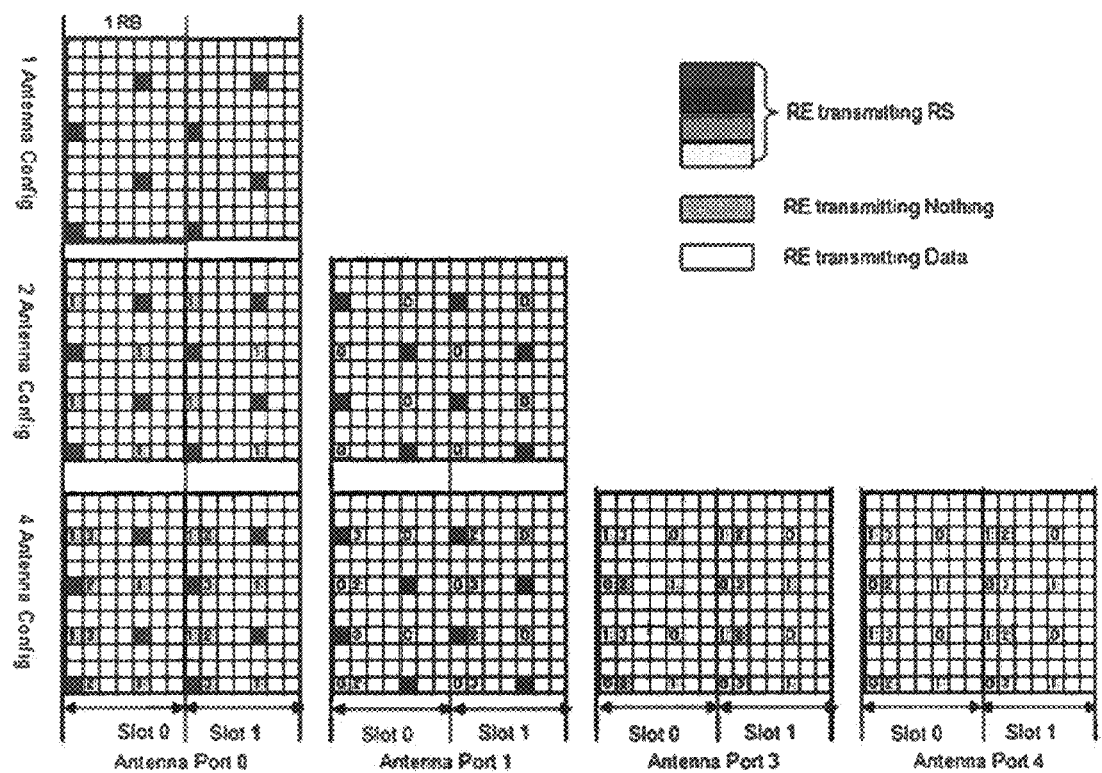
FIG. 1 illustrates example time slots in which the reference signal is carried.
Figure 2:
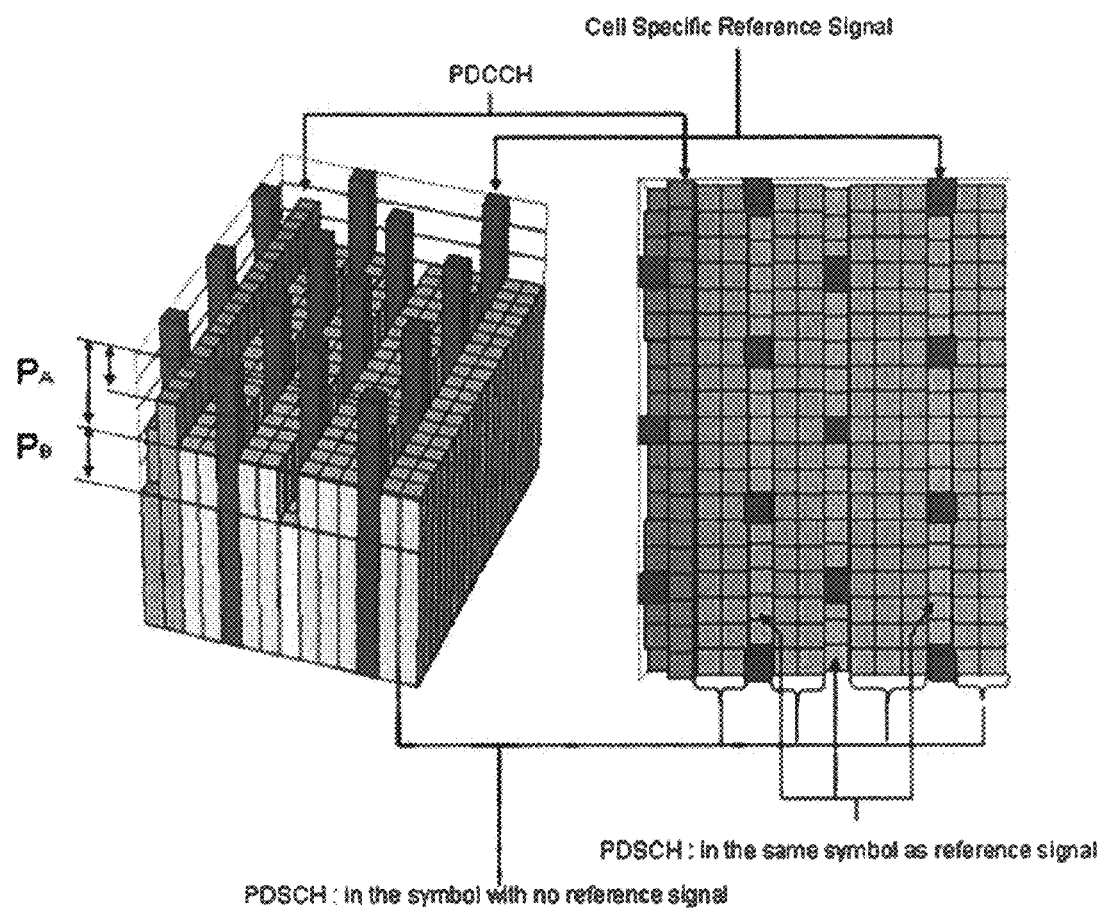
FIG. 2 illustrates example powers of the CRS signal.
Figure 3:
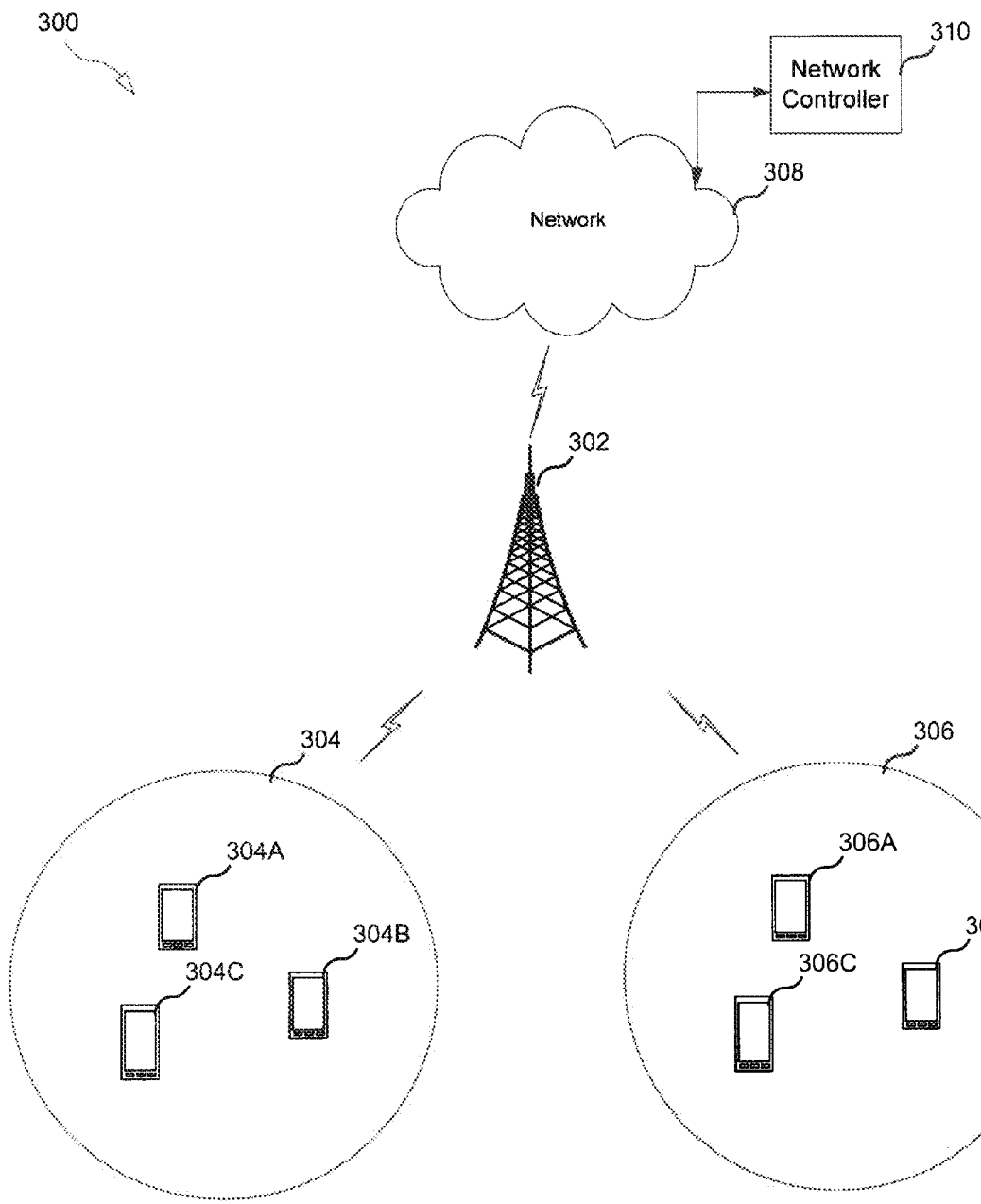
FIG. 3 illustrates an exemplary wireless communication system according to some embodiments.

FIG. 3 illustrates an exemplary wireless communication system 300 according to some embodiments. The system 300 includes a base station 302 serving one or more of cells 304 and 306. The base station 302 may be connected to a network controller 310 via network 308. Cell 304 includes UEs 304A-304C, and cell 306 includes UEs 306A-306C. It is understood by one of ordinary skill in the art that the base station 302 may serve more or less than two cells, and any number of UEs may be located within a given cell at any given time. According to some embodiments, the base station 302 is an evolved Node B (eNB).

In some embodiments, the non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

The embodiments are described using LTE concepts. However, the embodiments are applicable to any RAT or multi-RAT systems, where the UE regularly assess the serving cell performance by the virtue of the RLM procedure, or equivalent procedures, e.g., LTE FDD/TDD, WCDMA/HSPA, GSM/GERAN, Wi Fi, CDMA2000, etc.

Figure 4:
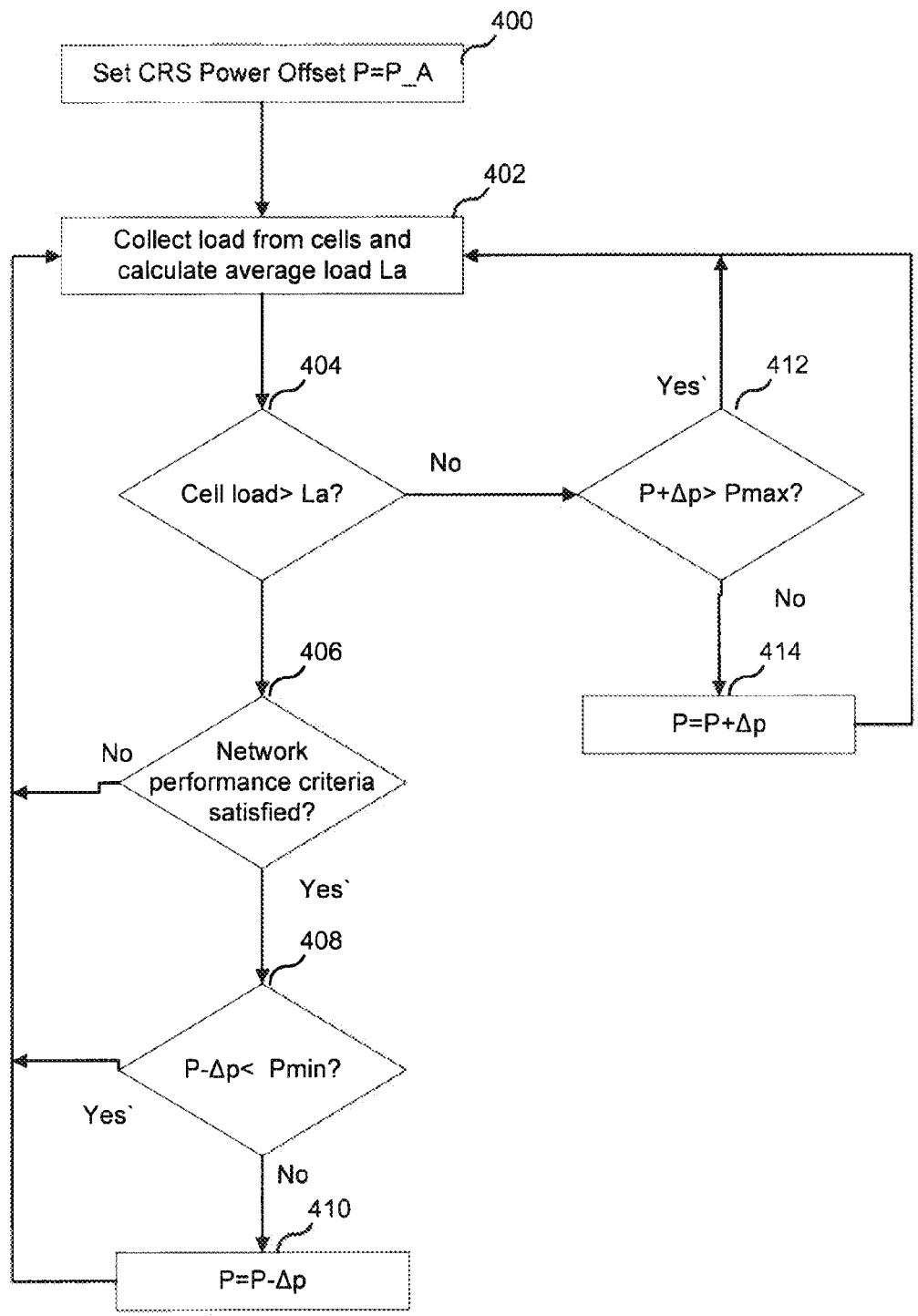
FIG. 4 is a flow chart illustrating a process according to some embodiments.

FIG. 4 illustrates an embodiment of an exemplary process performed by base station 302. The process may generally start at 400 where, initially, all cells of the base station have the same power boost (a.k.a., "power offset") P_A, and, in each cell, a cell specific reference signal (CRS) is transmitted at a power level that is determined using the power offset, P_A. In step 402, cell load information regarding the load of each cell of a plurality of cells is collected, and an average cell load $L_a$ is calculated. In some embodiments, step 402 is performed periodically (i.e., every 15 minutes). Cell load information collected by the base station may include information pertaining to downlink throughput and uplink throughput of each UE in each cell.

In step 404, it is determined whether the cell load for a particular cell is greater than the determined average cell load ($L_a$). If the cell load for the particular cell is greater than La, then the process proceeds to step 406, where it is determined whether network performance criteria are satisfied. In a first network performance embodiment, the network performance criteria includes determining whether a particular percentage of UEs are violating QoS requirements. Different traffic might have different QoS requirements. For UE's having a best effort requirement, the network performance criteria is satisfied if a percentage of UEs in the particular cell having a throughput below a minimum throughput threshold ($T_{min}$) is less than or equal to a predetermined percentage (i.e., 5%). For example, if 5% or less of UE's in a particular cell have a throughput less than $T_{min}$, the network performance criteria is satisfied.

In a second network performance embodiment, the network performance criteria includes determining whether a particular percentage of UEs are not experiencing a packet loss rate higher than a predetermined threshold. For example, if 95% of UE's in the particular cell are not experiencing a packet loss rate higher than a predetermined threshold, the network performance criteria is satisfied. In a third network performance embodiment, the network performance criteria includes determining whether the average UE throughput (TA) is above a predefined UE average throughput threshold ($T_a$). In some embodiments, the network performance criteria is satisfied if all three network performance embodiments are satisfied.

If the network performance criteria is not satisfied, the process returns from 406 to 402. If the network performance criteria is satisfied, the process proceeds to step 408 to determine whether adjusting power of the CRS signal would cause the power offset to fall below a minimum power threshold ($P_{min}$). For example, if the CRS signal power (P) were to be decreased by Δp, it is determined if P−Δp is less than $P_{min}$. If P−Δp is less than $P_{min}$, then the power of the CRS reference signal is not adjusted and the process returns to 402. If P−Δp is not less than $P_{min}$, then the process proceeds to 410 where the power of the CRS reference signal is decreased by Δp. After the CRS power is adjusted, the process returns to 402.

In step 404, if the cell load of the particular cell is greater than $L_a$, then the process proceeds to step 412, to determine whether adjusting the power of the CRS signal would cause the power offset to rise above a maximum power threshold ($P_{max}$). For example, if the CRS signal power (P) is increased by Δp, it is determined if P+Δp is greater than $P_{max}$. If P+Δp is greater than $P_{max}$, then the power of the CRS reference signal is not adjusted and the process returns to 402. If P+Δp is not greater than $P_{max}$, then the process proceeds to 410 where the power of the CRS reference signal is decreased by Δp. After the CRS power is adjusted, the process returns to 402. In some embodiments, steps 404-414 are performed for each cell controlled by the base station. In some embodiments, $P_{min}$ and $P_{max}$ are predefined parameters.

In some embodiments, the value Δp is predetermined for each cell controlled by the base station. For examine, if the base station controls five cells, each of the five cells will have a different predetermined Δp. In some embodiments, the value of Δp is dynamically determined by the base station for each cell controlled by the base station. The value of Δp may be based on one or more of the cell load, packet loss rate, and network throughput for a particular cell.

Figure 5:
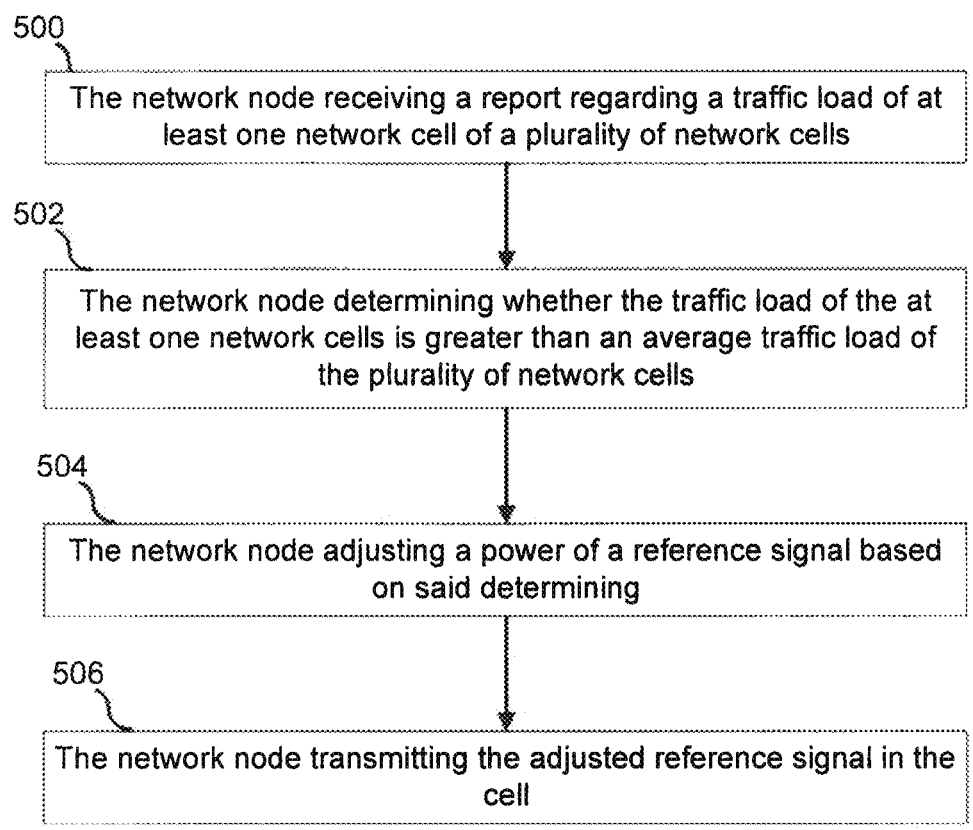
FIG. 5 is a flow chart illustrating a process according to some embodiments.

FIG. 5 illustrates an embodiment of a process performed by a network node such as base station 302. The process may start at step 500, where the network node receives a report regarding a traffic load of the at least one network cell of a plurality of network cells. In step 502, the network node determines whether the traffic load of the at least one network cells is greater than an average traffic load of the plurality of network cells. In step 504, the network node adjusts a power of a reference signal based whether the traffic load of the at least one network cells is greater than an average traffic load of the plurality of network cells (e.g., the power offset for the reference signal may be increased or decreased). In step 506, the network node transmits the adjusted reference signal in the cell. That is, the network node transmits the reference signal using a power that is based on the adjusted power offset.

Figure 6:
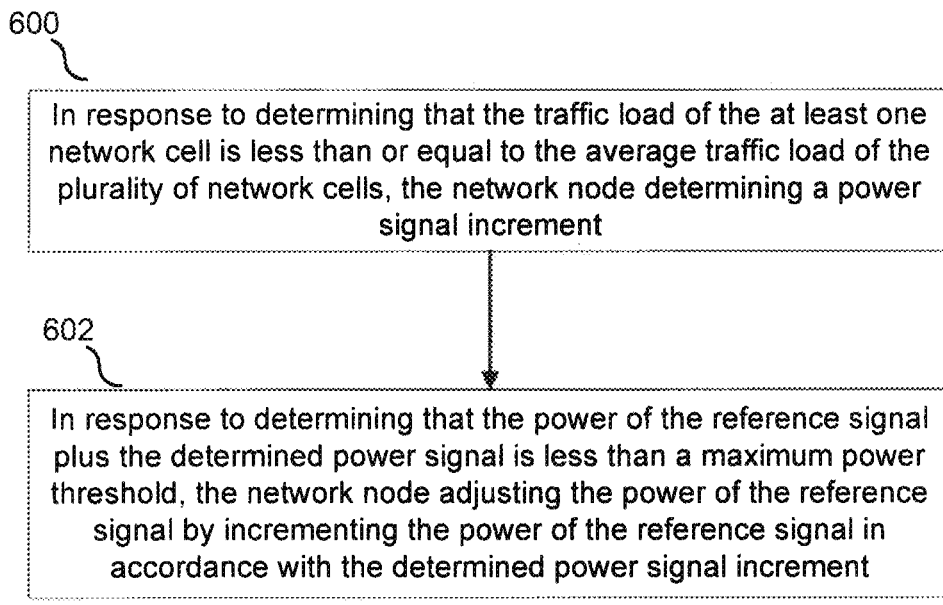
FIG. 6 is a flow chart illustrating a process according to some embodiments.

FIG. 6 illustrates an embodiment of a process performed by a network node such as base station 302. The process may generally start at step 600 where in response to determining that the traffic load of the at least one network cell is less than or equal to the average traffic load of the plurality of network cells, the network node determines a power signal increment. In step 602, in response to determining that the power of the reference signal plus the determined power signal is less than a maximum power threshold, the network node adjusts the power of the reference signal by incrementing the power of the reference signal in accordance with the determined power signal increment.

Figure 7:
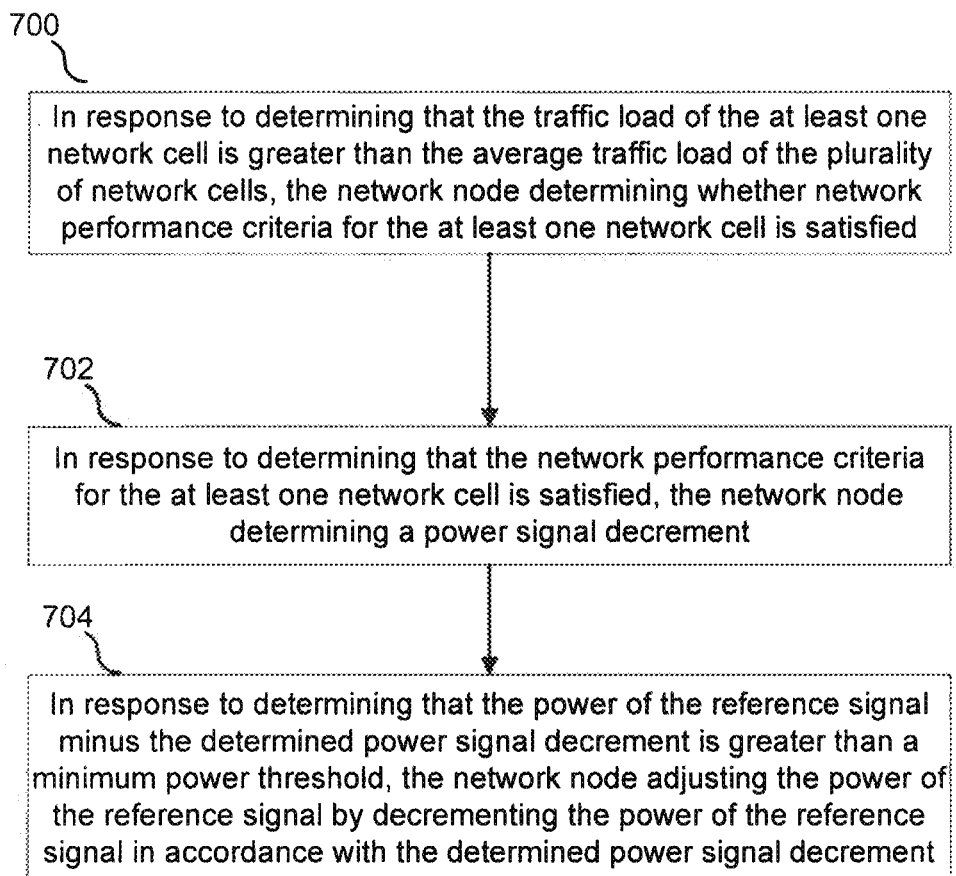
FIG. 7 is a flow chart illustrating a process according to some embodiments.

FIG. 7 illustrates an embodiment of a process performed by a network node such as base station 302. The process may generally start at 700 where in response to determining that the traffic load of the at least one network cell is greater than the average traffic load of the plurality of network cells, the network node determines whether network performance criteria for the at least one network cell is satisfied. In step 702, in response to determining that the network performance criteria for the at least one network cell is satisfied, the network node determines a power signal decrement. In step 704, in response to determining that the power of the reference signal minus the determined power signal decrement is greater than a minimum power threshold, the network node adjusts the power of the reference signal by decrementing the power of the reference signal in accordance with the determined power signal decrement.

According to some embodiments, the network performance criteria specifies that a number of user equipments experiencing a degradation in network throughput is below a first predetermined percentage. In some embodiments, the degradation in network throughput includes experiencing a delay in transmitting a packet from a user equipment located in the at least one network cell to the network node that exceeds a latency threshold.

According to some embodiments, the network performance criteria further specifies that a number of user equipments in the at least one network cell experiencing a packet loss rate that is below a loss rate threshold is above a second predetermined percentage. In some embodiments, the network performance criteria further specifies that an average user equipment throughput of the at least one network cell is above a predetermined user equipment throughput threshold. In some embodiments, the reference signal is a cell specific reference signal.

Figure 8:
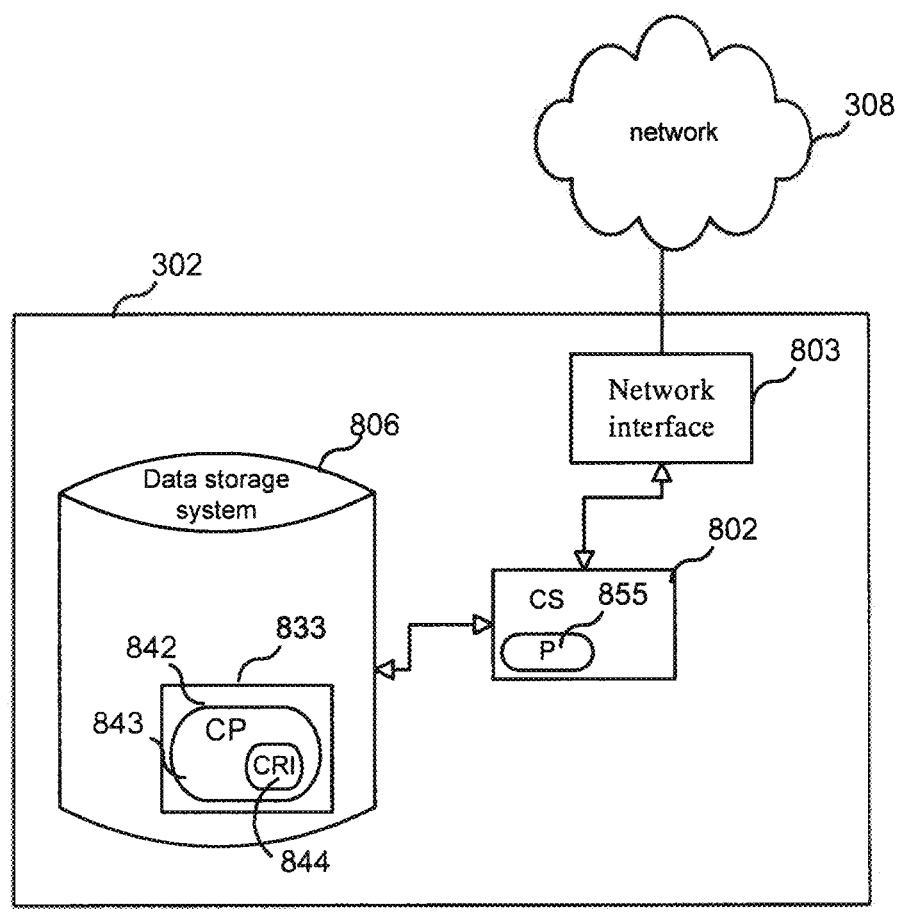
FIG. 8 is a block diagram of a base station according to some embodiments.

FIG. 8 is a block diagram of an embodiment of base station 302. As shown in FIG. 8, base station 302 may include or consist of: a computer system (CS) 802, which may include one or more processors 855 (e.g., a general purpose microprocessor) and/or one or more circuits, such as an application specific integrated circuit (ASIC), field-programmable gate arrays (FPGAs), a logic circuit, and the like; a network interface 803 for use in connecting base station 302 to a network; and a data storage system 806, which may include one or more non-volatile storage devices and/or one or more volatile storage devices (e.g., random access memory (RAM)). In embodiments where base station 302 includes a processor 855, a computer program product (CPP) 833 may be provided. CPP 833 includes or is a computer readable medium (CRM) 842 storing a computer program (CP) 843 comprising computer readable instructions (CRI) 844. CRM 842 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 844 of computer program 843 is configured such that when executed by computer system 802, the CRI causes the base station 302 to perform steps described above (e.g., steps described above with reference to the flow charts and message flows shown in the drawings). In other embodiments, base station 302 may be configured to perform steps described herein without the need for a computer program. That is, for example, computer system 802 may consist merely of one or more ASICs. Hence, the features of the embodiments described herein may be implemented in hardware and/or software.

Figure 9:
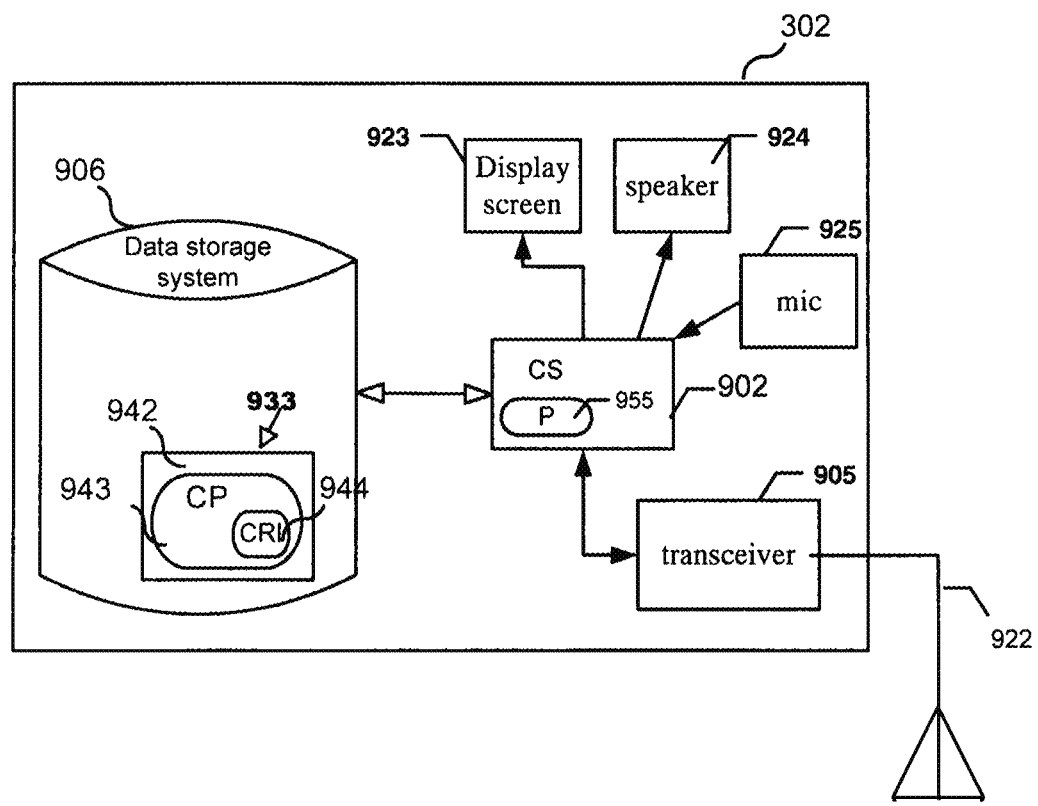
FIG. 9 is a block diagram of a UE according to some embodiments.

FIG. 9 is a block diagram of a UE such as UEs 304A-304C and 306A-306C according to some embodiments. As shown in FIG. 9, UE may include or consist of: a computer system (CS) 902, which may include one or more processors 955 (e.g., a general purpose microprocessor) and/or one or more circuits, such as an application specific integrated circuit (ASIC), field-programmable gate arrays (FPGAs), a logic circuit, and the like; a transceiver 905, coupled to an antenna, 922 for transmitting and receiving data wireless; and a data storage system 906, which may include one or more non-volatile storage devices and/or one or more volatile storage devices (e.g., random access memory (RAM)). In embodiments where UE includes a processor 955, a computer program product (CPP) 933 may be provided. CPP 933 includes or is a computer readable medium (CRM) 942 storing a computer program (CP) 943 comprising computer readable instructions (CRI) 944. CRM 942 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 944 of computer program 943 is configured such that when executed by computer system 902, the CRI causes the UE to perform steps described above (e.g., steps described above with reference to the flow charts and message flows shown in the drawings). In other embodiments, UE may be configured to perform steps described herein without the need for a computer program. That is, for example, computer system 902 may consist merely of one or more ASICs. Hence, the features of the embodiments described herein may be implemented in hardware and/or software. As shown in FIG. 9, UE may include: a display screen 933, a speaker 924, and a microphone ("mica"), all of which are coupled to CS 902.

The present embodiments provide a solution to help evenly distribute the load among different cells while maintaining the performance requirements of, for example, UE throughput. The present embodiments can be used together with other load balancing mechanisms such as during handovers to achieve balanced load inside a network and thus, maximize performance.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

CRS Cell Specific Reference Signal
DL Downlink power
DPCCH Downlink Paging Control Channel
PBCH Physical broadcast channel
UE User Equipment

The invention claimed is:

1. A method performed in a network node, the method comprising:
  the network node determining a first traffic load for a first network cell of a plurality of network cells, said plurality of network cells comprising a second network cell and a third network cell;
  for each of the plurality of network cells, the network node determining a traffic load value, thereby determining a plurality of traffic load values;
  the network node determining the average of said plurality of traffic load values, thereby determining an average traffic load of the plurality of network cells;
  the network node determining whether the first traffic load of the first network cell is greater than the determined average traffic load of the plurality of network cells;
  the network node adjusting a power of a reference signal based on said determining; and
  the network node transmitting the adjusted reference signal in the first network cell, wherein
  adjusting the power of the reference signal based on said determining comprises:
    determining a network performance parameter for the first network cell;
    determining whether the network performance parameter meets a network performance criteria;
    determining whether a current power of the reference signal is above a predetermined minimum power threshold by at least a power signal decrement; and
    decreasing the power of the reference signal by an amount equal to the power signal decrement as a result of determining that: 1) the first traffic load of the first network cell is greater than the determined average traffic load of the plurality of network cells, 2) the network performance parameter for the cell meets the network performance criteria, and 3) the current power level of the reference signal is above the predetermined minimum power level by at least the power signal decrement.

2. The method of claim 1, further comprising,
in response to determining that the first traffic load of the first network cell is less than or equal to the average traffic load of the plurality of network cells, the network node determining a power signal increment; and
in response to determining that the power of the reference signal plus the determined power signal increment is less than a maximum power threshold, the network node adjusting the power of the reference signal by incrementing the power of the reference signal in accordance with the determined power signal increment.

3. The method of claim 1, wherein
determining the network performance parameter for the first network cell comprises: 1) for each user equipment (UE) being served by the network cell, determining whether a quality of service (QoS) requirement for the UE is not being met; 2) determining the total number of UEs served by the network cell for which the QoS requirement is not being met; and 3) determining the percentage of the UEs being served by the first network cell for which the QoS requirement is not being met, and
determining whether the network performance parameter meets the network performance criteria comprises determining whether the determined percentage of the UEs exceeds a performance threshold.

4. The method of claim 1, wherein
determining the network performance parameter for the first network cell comprises: 1) for each user equipment (UE) being served by the network cell, determining the UE's packet loss rate; 2) for each determined packet loss rate, determining whether the packet loss rate exceeds a packet loss threshold; 3) determining the total number of UEs served by the network cell that have a determined packet loss rate that exceeds the packet loss threshold; and 4) determining the percentage of the UEs being served by the first network cell that have a determined packet loss rate that exceeds the packet loss threshold, and
determining whether the network performance parameter meets the network performance criteria comprises determining whether the determined percentage of the UEs exceeds a performance threshold.

5. The method of claim 1, wherein the network node is a base station and the reference signal is a cell specific reference signal.

6. The method of claim 1,
wherein the network node transmits the adjusted reference signal in a radio frame including a plurality of slots,
wherein the transmitted adjusted reference signal is assigned to a first slot from the plurality of slots;
wherein a non-reference signal is assigned to a second slot from the plurality of slots, and
wherein the network node does not adjust the power of the non-reference signal assigned to the second slot.

7. A network node, the network node comprising:
a processor; and
a non-transitory computer readable medium coupled to the processor, said computer readable medium containing instructions executable by the processor, whereby the network node is operative to:
determine a first traffic load of a first network cell of a plurality of network cells comprising a second network cell and a third network cell,
determine, for each of the plurality of network cells, a traffic load value, thereby determining a plurality of traffic load values,
determine the average of said plurality of traffic load values, thereby determining an average traffic load of the plurality of network cells, determine whether the first traffic load of the first network cell is greater than the average traffic load of the plurality of network cells, adjust a power of a reference signal based on said determination, and transmit the adjusted reference signal in the first network cell, wherein the network node is configured to adjust the power of the reference signal based on said determining by performing a process comprising:

determining a network performance parameter for the first network cell;

determining whether the network performance parameter meets a network performance criteria;

determining whether a current power of the reference signal is above a predetermined minimum power threshold by at least a power signal decrement; and decreasing the power of the reference signal by an amount equal to the power signal decrement as a result of determining that: 1) the first traffic load of the first network cell is greater than the determined average traffic load of the plurality of network cells, 2) the network performance parameter for the cell meets the network performance criteria, and 3) the current power level of the reference signal is above the predetermined minimum power level by at least the power signal decrement.

8. The network node of claim 7, whereby the network node is further operative to:

in response to determining that the first traffic load of the first network cell is less than or equal to the average traffic load of the plurality of network cells, determine a power signal increment, and in response to determining that the power of the reference signal plus the determined power signal increment is less than a maximum power threshold, adjust the power of the reference signal by incrementing the power of the reference signal in accordance with the determined power signal increment.

9. The network node of claim 7, wherein the network node is configured to determine the network performance parameter for the first network cell by performing a process comprising: 1) for each user equipment (UE) being served by the network cell, determining whether a quality of service (QoS) requirement for the UE is not being met; 2) determining the total number of UEs served by the network cell for which the QoS requirement is not being met; and 3) determining the percentage of the UEs being served by the first network cell for which the QoS requirement is not being met, and the network node is configured to determine whether the network performance parameter meets the network performance criteria by performing a process comprising determining whether the determined percentage of the UEs exceeds a performance threshold.

10. The network node of claim 9, wherein the network node is configured to determine the network performance parameter for the first network cell by performing a process comprising: 1) for each user equipment (UE) being served by the network cell, determining the UE's packet loss rate; 2) for each determined packet loss rate, determining whether the packet loss rate exceeds a packet loss threshold; 3) determining the total number of UEs served by the network cell that have a determined packet loss rate that exceeds the packet loss threshold; and 4) determining the percentage of the UEs being served by the first network cell that have a determined packet loss rate that exceeds the packet loss threshold, and the network node is configured to determine whether the network performance parameter meets the network performance criteria by performing a process comprising determining whether the determined percentage of the UEs exceeds a performance threshold.

11. The network node of claim 7, wherein the network node is a base station and the reference signal is a cell specific reference signal.

12. A computer product comprising a non-transitory computer readable medium storing computer instructions, which when executed by a network node cause the network node to:

determine a first traffic load of a first network cell of a plurality of network cells comprising a second network cell and a third network cell;

determine, for each of the plurality of network cells, a traffic load value, thereby determining a plurality of traffic load values, determine the average of said plurality of traffic load values, thereby determining an average traffic load of the plurality of network cells, determine whether the first traffic load of the first network cell is greater than the average traffic load of the plurality of network cells;

adjust a power of a reference signal based on said determining; and transmit the adjusted reference signal in the first network cell, wherein the computer instructions further configure the network node such that the network node adjusts the power of the reference signal based on said determining by performing a process comprising:

determining a network performance parameter for the first network cell;

determining whether the network performance parameter meets a network performance criteria;

determining whether a current power of the reference signal is above a predetermined minimum power threshold by at least a power signal decrement; and decreasing the power of the reference signal by an amount equal to the power signal decrement as a result of determining that: 1) the first traffic load of the first network cell is greater than the determined average traffic load of the plurality of network cells, 2) the network performance parameter for the cell meets the network performance criteria, and 3) the current power level of the reference signal is above the predetermined minimum power level by at least the power signal decrement.

13. A method performed in a network node for adjusting a power offset for a cell specific reference signal (CRS) for use in a cell of a wireless network, the method comprising:

the network node transmitting the CRS in the cell at a first power level;

the network node determining the load of the cell;

the network node determining whether the load of the cell exceeds a load threshold;

the network node determining a network performance parameter for the cell;

the network node determining whether the determined network performance parameter meets a network performance criteria;

the network node determining whether the first power level is above a predetermined minimum power level by at least a power signal decrement; and the network node transmitting the CRS in the cell at a power level equal to the first power level minus the power signal decrement as a result of determining that: 1) the load of the cell exceeds the load threshold, 2) the network performance parameter for the cell meets the network performance criteria, and 3) the first power level is above the predetermined minimum power level by at least the power signal decrement.

14. The method of claim 13, wherein determining the network performance parameter for the cell comprises: 1) for each user equipment (UE) being served by the cell, determining the UE's packet loss rate; 2) for each determined packet loss rate, determining whether the packet loss rate exceeds a packet loss threshold; 3) determining the total number of UEs served by the network cell that have a determined packet loss rate that exceeds the packet loss threshold; and 4) determining the percentage of the UEs being served by the first network cell that have a determined packet loss rate that exceeds the packet loss threshold, and determining whether the network performance parameter meets the network performance criteria comprises determining whether the determined percentage of the UEs being served by the first network cell that have a determined packet loss rate that exceeds the packet loss threshold exceeds a performance threshold.

15. The method of claim 13, wherein determining the network performance parameter for the cell comprises: 1) for each user equipment (UE) being served by the cell, determining whether a quality of service (QoS) requirement for the UE is not being met; 2) determining the total number of UEs served by the cell for which the QoS requirement is not being met; and 3) determining the percentage of the UEs being served by the cell for which the QoS requirement is not being met, and determining whether the network performance parameter meets the network performance criteria comprises determining whether the determined percentage of the UEs exceeds the packet loss threshold exceeds a performance threshold.

16. The method of claim 15, wherein the method further comprises determining the load threshold, wherein determining the load threshold comprises: 1) for each of the plurality of cells, the network node determining a traffic load value, thereby determining a plurality of traffic load values; and 2) the network node determining the average of said plurality of traffic load values, thereby determining an average traffic load of the plurality of cells, and the step of determining whether the load of the cell exceeds a load threshold comprises determining whether the load of the cell exceeds the determined average traffic load of the plurality of cells.

\* \* \* \* \*